(No Model.)
C. E. LUBURG.
TIRE FOR BICYCLES.
No. 505,530. Patented Sept. 26, 1893.
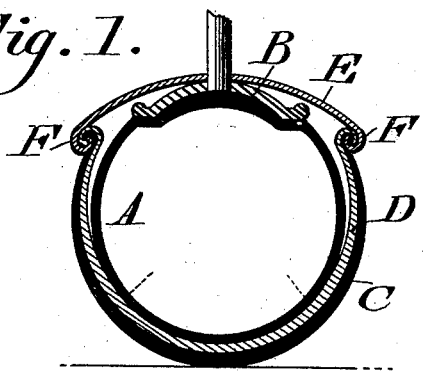
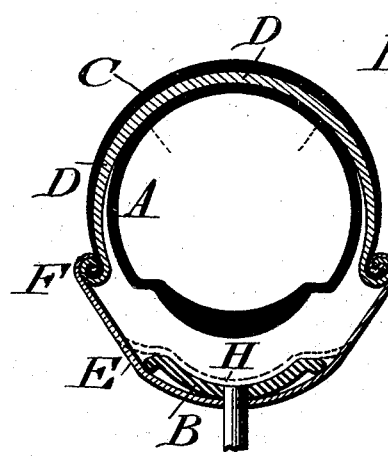
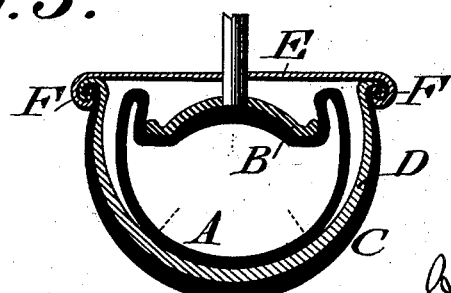
WITNESSES:
P. F. Nagle.
L. Douville.
INVENTOR
Charles E. Luburg
BY
ATTORNEY.

UNITED STATES PATENT OFFICE.

CHARLES E. LUBURG, OF PHILADELPHIA, PENNSYLVANIA, ASSIGNOR TO THE LUBURG MANUFACTURING COMPANY, OF PENNSYLVANIA.

TIRE FOR BICYCLES.

SPECIFICATION forming part of Letters Patent No. 505,530, dated September 26, 1893.

Application filed October 10, 1892. Serial No. 448,297. (No model.)

*To all whom it may concern:*

Be it known that I, CHARLES E. LUBURG, a citizen of the United States, residing in the city and county of Philadelphia, State of Pennsylvania, have invented a new and useful Improvement in Tires for Bicycles, &c., which improvement is fully set forth in the following specification and accompanying drawings.

My invention consists of a tire for a bicycle, &c., which is provided with a protective casing as hereinafter described which prevents penetration of the tire by sharp objects.

It also consists of a guard of novel construction, for preventing the entrance of dust, dirt, &c., between said tire and casing, as will be hereinafter set forth.

Figure 1 represents a transverse section of a tire embodying my invention, in normal condition. Figs. 2 and 3 represent transverse sections of the upper and lower portions of the tire in operative position. Fig. 4 represents a section of one of the ends of the guard.

Similar letters of reference indicate corresponding parts in the several figures.

Referring to the drawings: A designates a tubular tire, and B designates a metallic rim on the inner periphery of said tire. Partly surrounding the tire A, is a casing formed of a sound-deadening facing C, and a rigid shoe D, which latter is interposed between said facing C and the tire A, whereby penetration of sharp objects into the tube is prevented, and thus the inflation of the tube is preserved. If desired, the portion of the guard continuous of the rim B, may be on the inner face of said rim, as shown by dotted lines at H, Fig. 2.

E designates a dust-guard which extends over the rim B, and has its ends connected with the casing C, D, by means of lap joints F, said dust-guard E being formed of elastic material, and covering the space between the tire A and the casing C, D. In order that said dust-guard may firmly embrace the ends of the casing C, D, there are embedded and vulcanized in the ends of the dust-guard E, pieces G of metal, by which provision the connected parts of the lap joints F may be readily bent on each other, and thus retain their positions, without liability of separation.

It will be seen that when the bicycle, &c., is in use or loaded, the inner periphery of the tire is bent in by the action of the rim B, due to the weight thereon, as will be seen in Fig. 3, while the portion of the tire at the top of the wheel rises from said rim B, as shown in Fig. 2, the dust-guard, however, covering the space between the tire and casing under all circumstances, and preventing dirt, &c., from reaching the tire.

Having thus described my invention, what I claim as new, and desire to secure by Letters Patent, is—

1. A tubular pneumatic tire having a metallic rim on its inner periphery, and a sound-deadening facing partially surrounding it, with an intervening rigid shoe, and a guard within the rim having its ends connected with the ends of the facing and shoe, said parts being combined substantially as described.

2. A tubular pneumatic tire having a casing consisting of a sound-deadening substance with a rigid shoe, and a dust guard having in its ends pieces of metal, the ends of said dust guard and said casing being lapped together, said parts being combined substantially as described.

CHARLES E. LUBURG.

Witnesses:
HAROLD E. BROWNE,
J. A. SMITH.